United States Patent Office 3,534,035
Patented Oct. 13, 1970

3,534,035
TETRAHYDRONAPHTHALENE SULFONIC ACID ADDITION SALT OF AMPICILLIN AND PROCESS
John J. Nescio, West Chester, Pa., assignor to American Home Products Corporation, New York, N.Y., a corporation of Delaware
No Drawing. Filed Jan. 31, 1968, Ser. No. 701,830
Int. Cl. C07d 99/16
U.S. Cl. 260—239.1       5 Claims

ABSTRACT OF THE DISCLOSURE

The tetrahydronaphthalene sulfonic acid addition salt of D - 6 - (2-amino-2-phenylacetamido)penicillanic acid (ampicillin) is prepared by contacting aqueous solutions of ampicillin with tetrahydronaphthalene sulfonic acid. The new addition salt has useful antibacterial properties. It also is useful to prepare crystalline anhydrous ampicillin in high yield without without the ned to isolate and use crystalline hydrated forms as precursors by a process comprising heating a mixture of (1) the tetrahydronaphthalene sulfonic acid addition salt of D-6-(2-amino-2-phenylacetamido)penicillanic acid, (2) an amide and (3) an at least partially water-miscible organic solvent with a controlled amount, i.e., at least about 10% by weight, of water, bound and free, based on solids present.

---

This invention relates to derivatives of penicillanic acid, and to processes for their preparation and use. More particularly it is concerned with the novel tetrahydronaphthalene sulfonic acid addition salt of D-6-(2-amino-2-phenylacetamido)penicillanic acid, with means for the preparation of said acid addition salt and with a novel method for its use in converting aqueous reaction mixtures containing D-6-(2-amino-2-phenylacetamido)penicillanic acid into crystalline anhydrous ampicillin.

BACKGROUND OF THE INVENTION

The compound D - 6 - (2-amino-2-phenylacetamido) penicillanic acid per se, also known by the generic term "ampicillin" is of proven value in its broad spectrum antibacterial activity and is useful as a therapeutic agent in poultry and mammals, and particularly in man, in the treatment of infectious diseases caused by Gram-positive and Gram-negative bacteria, upon parenteral or oral administration. It also has use as a nutritional supplement in animal feed.

Ampicillin exists in several hydrated crystalline forms as well as in an anhydrous crystalline form. One hydrated form, the monohydrate, is known to the art from the disclosure in F. P. Doyle, J. H. C. Nayler and H. Smith, U.S. 2,985,648, in which is taught a relatively complex method for the preparation thereof. Another form of ampicillin, the trihydrate, is described and characterized in H. E. Alburn and N. H. Grant, U.S. 3,299,046. Still another crystallite form of ampicillin is the substantially anhydrous form, described, characterized and claimed by N. H. Grant and H. E. Alburn in U.S. 3,144,445. The present invention, in one of its major aspects, is concerned with the preparation of this anhydrous crystalline form of ampicillin.

Anhydrous ampicillin often is desired instead of the hydrated form because of its unexpectedly highly advantageous storage stability characteristics. Because of this stability, coupled with its denseness, the efficiency of production of the anhydrous compound in capsule dosage form is increased. As a further advantage, linked to its lesser solubility in water, anhydrous ampicillin exhibits slower absorption in the gut and hence provides prolonged blood levels and more effective action against intestinal pathogens than do the hydrated ampicillins. These factors, including antibiotic utility in human therapy, are discussed in the aforementioned U.S. 3,144,445.

Several means for the preparation of anhydrous ampicillin are known in the art. The means selected has depended on the precursor, which in all cases has been a crystalline hydrate of ampicillin. For eample, as is disclosed in U.S. 3,144,445, when the precursor comprises crystalline hydrate of ampicillin. For example, as is disable means comprises heating the crystalline hydrate in the presence of free water at a temperature of from 40° C. to about 100° C. until the anhydrous ampicillin crystals are formed. When, on other hand, the precursor comprises crystalline ampicillin trihydrate, the above-outlined method is not effective, and a means such as that disclosed in the aforesaid U.S. 3,299,046 is employed. This comprises, generally, preparing a mixture of the crystalline trihydrate, at least some free water, and a water-miscible organic solvent and heating the mixture to a temperature of from about 50° C. to about 100° C., then recovering the crystalline anhydrous form. Any of the mentioned procedures requires the use of isolated crystalline hydrates of ampicillin and the isolation of these from the dilute mixtures after their synthesis represents costly and time-consuming processing operations because of the relatively large amounts of water (and in some cases, organic solvents) to be removed before crystallization. Most of the earlier methods for isolation of the crystalline hydrates involved evaporation of large volumes of water (or solvent) at low temperatures—for example, freeze-drying is used on a small scale. It is noteworthy also to mention that the crystalline trihydrate of ampicillin is extremely difficult (slow) to filter and this often tends to slow down production of the anhydrous form if the trihydrate is used as a precursor, especially on a large scale. It would be desirable therefore to provide a means to obtain anhydrous ampicillin which does not require the use of an isolated crystalline hydrated ampicillin as a precursor. It would also be desirable to have a means to provide crystalline anhydrous ampicillin by using as starting material for the process the dilute mixtures resulting from the synthesis of ampicillin. It has surprisingly now been found that, if the means of the instant invention is used, ampicillin can be precipitated as a novel tetrahydronaphthalene sulfonic acid addition salt from dilute synthesis mixtures and the said acid addition salt can be converted directly, without passing through intermediate hydrated ampicillins, into crystalline anhydrous ampicillin. Furthermore, the crystalline anhydrous ampicillin is obtained in higher yield and in better purity than generally is possible via hydrated crystalline precursors. In addition to its use in preparing crystalline anhydrous ampicillin, the aforesaid tertrahydronaphthalene sulfonic acid addition salt of ampicillin is unexpectedly useful directly as a therapeutic agent because it possesses about the same antibacterial properties as the corresponding ampicillin.

It is, accordingly, a primary object of the instant invention to provide crystalline anhydrous ampicillin in good yield and in a high state of purity.

It is a further primary object to provide the tetrahydronaphthalene sulfonic acid addition salt of D-6-(2-amino-2-phenylacetamido)penicillanic acid (ampicillin) useful therapeutically for its antibacterial properties and also in the instant means to prepare crystalline anhydrous ampicillin.

It is a further object to provide crystalline anhydrous ampicillin without the need to isolate and use crystalline hydrated ampicillins as precursors.

Still another object of the instant invention is to provide crystalline anhydrous ampicillin from the product which precipitates after treating a dilute ampicillin-containing medium with a tetrahydronaphthalene sulfonic acid.

A further object of the instant invention is to provide crystalline anhydrous ampicillin by a means which avoids the need to isolate and use the crystalline trihydrate of ampicillin as a precursor, and which precludes the formation of the said trihydrate in any stage of the process.

DESCRIPTION OF THE INVENTION

These and other objects readily apparent to those skilled in the art are easily achieved by use of the compound contemplated by the instant invention:

The tetrahydronaphthalene sulfonic acid addition salt of D-6-(2-amino-2-phenylacetamido)penicillanic acid, also referred to in this specification as the tetrahydronaphthalene sulfonic acid addition salt of ampicillin. Named in accordance with other acceptable nomenclature, it could be referred to as the tetrahydronaphthalene sulfonic acid salt of α-aminobenzyl penicillin. The expression in its broadest sense contemplates and includes hydrates of the compound as well as the anhydrous compound.

Also contemplated by the instant invention is a process for the preparation of the anhydrous crystalline form of D-6-(2-amino-2-phenylacetamido)penicillanic acid, which method comprises heating at a temperature of from about 50° C. to about 100° C. a mixture comprising (1) the tetrahydronaphthalene sulfonic acid addition salt of D-6-(2-amino-2-phenylacetamido)penicillanic acid, (2) at least about 1 equivalent, based on said salt, of an amine of the formula

wherein R, $R^1$ and $R^2$ are, independently, hydrogen, (lower)alkyl or phenyl-substituted-(lower)alkyl, and (3) a reaction medium comprising (a) a water-miscible organic solvent capable of dissolving at least 5% thereof of water, and present in an amount that is at least 20% by volume of said medium and (b) sufficient free water to bring the total amount of bound and free water in the mixture to at least 10% by weight based on solids present until formation of said anhydrous crystalline form is substantially complete.

Special mention is made of a number of valuable embodiments of this invention. These are:

A process as defined above including the steps of separating and recovering said anhydrous crystalline form of D-6-(2-amino-2-phenylacetamido)penicillanic acid substantially free of the by-product amine—tetrahydronaphthalene sulfonic acid addition salt, water-miscible organic solvent and free water compounds in said mixture.

A process as first above defined wherein said amine is ammonia, diethylamine or triethylamine.

A process as first above defined wherein said water-miscible organic solvent comprises from about 50% to about 95% by volume of said medium and said heating occurs in the temperature range of from about 60° C. to about 85° C.

A process as first above defined wherein said water miscible organic solvent is isopropanol which comprises about 85% by volume of said medium and said heating occurs in the temperature range of from about 60° C. to about 75° C.

A process as first above defined including the steps of preparing said tetrahydronaphthalene sulfonic acid addition salt by providing an aqueous solution containing D-6-(2-amino - 2 - phenylacetamido)penicillanic acid or a water-soluble salt thereof, contacting said solution with tetrahydronaphthalene sulfonic acid or a water-soluble salt thereof, and adjusting the pH of the reaction mixture to within the range of from about 1.0 to about 3.5, preferably 1.5–2.0, until formation of the tetrahydronaphthalene sulfonic acid addition salt of D-6-(2-phenylacetamido)penicillanic acid is substantially complete.

A process as next above defined including the steps of adding to said aqueous solution an organic water immiscible solvent to form a mixture and contacting said mixture with said tetrahydronaphthalene sulfonic acid or water-soluble salt thereof.

A process as next above defined wherein said organic water immiscible solvent is methyl isobutyl ketone, ethyl acetate, amyl acetate or methylene chloride.

A process for the preparation of the anhydrous crystalline form of D-6-(2-amino-2-phenylacetamido)penicillanic acid, which method comprises:

Preparing the tetrahydronaphthalene sulfonic acid addition salt of D-6-(2-amino-2-phenylacetamido)penicillanic acid by providing an aqueous solution containing D-6-(2-amino-2-phenylacetamido)penicillanic acid or a water-soluble salt thereof, adding to said aqueous solution an organic water immiscible solvent to form a mixture, contacting said mixture with tetrahydronaphthalene sulfonic acid or a water soluble salt thereof, adjusting the pH of the reaction mixture to within the range of from about 1.5 to about 3.5, preferably 1.5–2.0, until formation of said addition salt is substantially complete, and collecting the said acid addition salt.

Preparing a mixture comprising (1) the said acid addition salt, (2) at least about 1 equivalent, based on said salt, of an amine of the formula

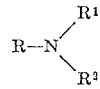

wherein R, $R^1$ and $R^2$ are, independently, hydrogen, (lower)alkyl or phenyl-substituted-(lower)alkyl and (3) a reaction medium comprising (a) a water-miscible organic solvent capable of dissolving at least 5% thereof of water, and present in an amount that is at least 20% by volume of said medium, and (b) sufficient free water to bring the total amount of bound and free water in the mixture to at least 10% by weight based on solids present, and heating said mixture at a temperature of from about 50° C. to about 100° C. until formation of said anhydrous crystalline form of D-6-(2-amino-2-phenylacetamido)penicillanic acid is substantially complete; and, if desired, combining this process with an embodiment which includes the steps of separating and recovering said anhydrous crystalline form of D-6-(2-amino-2-phenylacetamido)penicillanic acid substantially free of the by-product amine—tetrahydronaphthalene sulfonic acid addition salt, water-miscible organic solvent and free water components of said mixture.

As is mentioned hereinabove the new tetrahydronaphthalene sulfonic acid addition salt of ampicillin is prepared by treating aqueous solutions of ampicillin with tetrahydronaphthalene sulfonic acid. In one manner of proceeding, the ampicillin or water-soluble salt thereof, such as the sodium, potassium, calcium, aluminum, ammonium, hydrochloride, sulfate, or obviously chemically equivalent salt, is dissolved in water and then is contacted with at least an equimolar amount, preferably an excess, e.g., from about 1 to about 2 stoichiometric-equivalents of tetrahydronaphthalene sulfonic acid or water-soluble salt thereof, such as the ammonium or substituted ammonium, alkali metal or alkaline earth metal salts. Preferably the contacting is carried out at temperatures between about 0° C. and about 25° C. and especially preferred mixing temperatures are from about 0° C. to about 10° C. The pH of the mixture is maintained at a range of from about 1 to about 3.5, preferably from about 1.5 to about 2.0 under which conditions the instant acid addition salt crystallizes from the solution. In another manner of proceeding, which is a preferred embodiment of the method outlined immediately above, there is added to the dilute aqueous solution of ampicillin an organic water immiscible solvent to form a mixture, during, after or, preferably, before adding the tetrahydronaphthalene sulfonic acid to the mixture. Such a technique appears to facilitate crystallization of the instant acid addition salt, especially in those cases wherein the ampicillin solution contains by-products or organic impurities, resulting from its synthesis by; for example, the reaction of the N-carboxyanhydride of D-phenylglycine with 6-amino-penicillanic acid (6-APA, see U.S. 3,299,046, mentioned above), or the 6-APA-acylation procedures described, for example, in U.S. 2,985,648, mentioned above. Organic water immiscible solvents useful for this purpose include, for example, (lower)ketones, such as methyl isobutyl ketone; (lower)aliphatic esters, such as ethyl acetate, butyl acetate or amyl acetate; halogenated (lower)hydrocarbons, such as methylene chloride; aromatic hydrocarbons, such as toluene; and the like. Methyl isobutyl ketone, ethyl acetate, amyl acetate and methylene chloride are particularly important oragnic water-immiscible solvents in this embodiment. For example, the pH of an aqueous reaction mixture containing ampicillin is adjusted to 1.5–2.0 with dilute hydrochloric acid. After clarifying the acidic aqueous solution by filtration, about one-tenth volume of ethyl acetate or methyl isobutyl ketone is added and then a 30% weight/volume solution of tetrahydronaphthalene sulfonic acid in water containing a stoichiometrically-equivalent amount plus a 20% excess of active agent is added dropwise with stirring while maintaining a pH of 1.5–1.8 by concurrent addition of dilute sodium hydroxide. After stirring for about twelve hours at 2–5° C., the white, crystalline tetrahydronaphthalene sulfonic acid addition salt of ampicillin is collected by filtration, washed with cold water and finally with ethyl acetate. In making crystalline anhydrous ampicillin it is preferred to use the salt in the form of a wet filter cake and, generally speaking, one prepared as above containing 45 to 65% solids as shown by drying at 65–70° C., approximately 20 to 25% by weight of water by Karl Fischer titration, and approximately 15-30% of an orgnaic solvent, such as ethyl acetate, by difference, is especially suitable. If desired, of course, all of the volatiles can be removed by drying in a vacuum.

With respect to the amine used in the preparation of the reaction mixture used to obtain crystalline anhydrous ampicillin by the instant process, generally speaking a broad variety of primary, secondary and tertiary aliphatic amines, and ammonia, can be employed. It is desirable that the amine employed form a tetrahydronaphthalene-sulfonic acid addition salt which is soluble in the reaction mixture. The preferred amines are embraced by the formula

wherein R, $R^1$ and $R^2$ are, independently, hydrogen (lower)alkyl of from about 1 to about 6 carbon atoms, or phenyl-substituted-(lower)alkyl, the (lower)alkyl groups, in either case, being straight chain or branched. Included therefore are ammonia, primary, secondary, and tertiary (lower)aliphatic and phenyl-substituted-(lower) aliphatic amines, illustrative members of which are methylamine, ethylamine, n-propylamine, i-propylamine, n-butylamine, t-butylamine, n-pentylamine, n-hexylamine, 3 - methylpentylamine, benzylamine, 6 - phenyl-n-hexyl-amine, dimethylamine, diethylamine, di-n-propylamine, di-i-propylamine, di-n-butylamine, di-t-butylamine, di-n-pentylamine, di-n-hexylamine, di - (3 - methylpentyl) amine, dibenzylamine, di-(6-phenyl - n - hexyl)amine, trimethylamine, triethylamine, tri-n-propylamine, tri-i-propylamine, tri-t-butylamine, tri-nhexylamine, and the like. Especially preferred amines for reasons of ready availability and economy are ammonia, diethylamine and triethylamine.

With respect to the reaction medium, it has been discovered that the environment should contain, in addition to water, an organic solvent, which is preferably entirely miscible with water, or partially miscible with water at least to the extent that the organic solvent will retain 5% by volume of water in solution. For example, acetone, ethanol, isopropanol, n-propanol, n-butanol, ethylene glycol, ethylene glycol monomethyl ether, and dioxane, which meet the aforesaid requirements with respect to miscibility with water, have been found to be eminently suitable for use as the requisite organic solvent, and, in certain instances, even when included in proportions up to 95% of the reaction mixture. However, with the respect to the last, it has been found that the total water present in the processing mixture including both free and chemically bound water, must constitute at least about 10% by weight based on the acid-addition salt solids to obtain the desired conversion to the anhydrous ampicillin. On the other hand, when the organic solvent is present in the environment in concentrations of less than 20% by volume of said environment, the salutary effect of the solvent for permitting transformation of the acid addition salt to the desired crystalline anhydrous ampicillin is not in evidence.

When an organic solvent of suitable water miscibility is selected, and sufficient water is totally available in the bound and free state, as referred to above; it has been found that conversion of the tetrahydronaphthalene sulfonic acid addition salt of D-6-(2-amino-2-phenylacetamido)penicillanic acid to the anhydrous form of ampicillan may be carried out within the pH range of from about 5.2 to about 7.5, preferably 5.8 to 6.5. Optimum conversion yields appear to occur when the pH is maintained within the middle portion of the range. Conversion itself is caused to occur by maintaining the organic solvent, water and the said acid addition salt of ampicillin systems described within the temperature range of from about 50° C. to about 100° C., preferably from about 60° C. to about 75° C.

As has been indicated hereinabove, in connection with mention of specific embodiments, and as will be obvious to those skilled in the art after considering the instant disclosure, a number of different ways can be used for preparing the reaction mixture to convert the tetrahydronaphthalene sulfonic acid salt of ampicillin to crystalline anhydrous ampicillin. Merely by way of illustration, the process can be carried out by the addition of an undried acid addition salt to an organic solvent, e.g., isopropyl alcohol at about 25° C., containing an amine e.g., triethylamine, diethylamine or ammonia, then stirring for 10 minutes followed by rapid agitation and heating to 75–80° C. for 20 minutes. Alternatively, the conversion can be accomplished by the addition of the acid addition salt of ampicillin to a hot organic solvent, e.g., isopropyl alcohol solution of an amine, e.g., triethylamine, diethylamine or ammonia, heating and stirring at 75–80° C. for 20 minutes as above. The amount of amine it is preferred to employ is from at least about one stoichiometric equivalent, based on the acid addition salt, up to from about 3 to about a 6% excess. While somewhat less than one equivalent can be used, the purity of the product will suffer because of incomplete conversion and the use of excesses greater than 10% is not advantageous because there is then a tendency for the yield to decrease.

Since, as has been mentioned hereinabove, the tetrahydronaphthalene sulfonic acid addition salt of D-6-(2-amino-2-phenylacetamido)penicillanic acid of this invention possesses valuable anti-bacterial properties, it may be used directly as a therapeutic agent in the treatment of infections. It possesses about the same activity against both Gram-positive and Gram-negative bacteria upon either parenteral or oral administration as does ampicillin. Furthermore the instant compound is of particular value for such purposes because it exhibits excellent response, has a rapid onset of action, long lasting effect and relatively low toxicity.

When used herein and in the appended claims the term "tetrahydronaphthalene sulfonic acid" contemplates a compound of the formula:

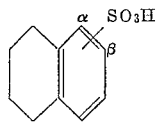

wherein the sulfonic acid group is fixed in either the α- or β-position, and mixtures of such α- or β-isomers. Tetrahydronaphthalene sulfonic acid can be made by techniques readily available to those skilled in the art and, in addition, it is an item of commerce.

DESCRIPTION OF THE PREFERRED EMBODIMENTS

The following examples illustrate the processes of the invention. They are merely illustrative and are not to be construed as limiting the scope of the claims in any manner whatsoever.

Example 1

A mixture of 32 g. of 6-aminopenicillanic acid (6-APA) and 3.6 liters of water is adjusted to pH 5.0 with 10 N NaOH. During vigorous stirring, 12 g. of D-phenylglycine-N-carboxyanhydride is added. After 1 hour, the solution is clarified by filtration. To the ampicillin-containing filtrate is added 400 ml. of ethyl acetate, then a solution of 68 g. of the sodium salt of tetrahydronaphthalene sulfonic acid in 200 ml. of water is added gradually at 8° C. The pH is adjusted to 1.5–1.8 with 50% sulfuric acid solution and the mixture is allowed to stir at 2–5° C. for 18 hours. Filtration and washing with cold water followed by washing with ethyl acetate affords 35.6 g. of wet (with water and ethyl acetate) filter cake containing 20.4 g. of the tetrahydronaphthalene sulfonic acid addition salt of D-6-(2-amino-2-phenylacetamido)penicillanic acid.

Charge a 500 ml. three-necked flask, which is equipped with stirrer, thermometer and condenser, with 40 ml. of anhydrous isopropanol. With stirring, add 3.7 g. of triethylamine and heat the solution to 75–80° C. Add to the hot solution as rapidly as possible, and with good agitation, the wet filter cake prepared above. Maintain temperature of 70–75° C. for 15 minutes. Without cooling, filter the hot slurry on a Büchner funnel—filtration is very fast. As soon as the cake is free of liquid, wash with 10 ml. of 85% aqueous isopropanol. Repeat with a second wash of 10 ml. of 85% isopropanol then remove as much solvent as possible with suction. Dry the crystalline anhydrous ampicillin in an air oven at 50° C.; recovery, 10.5 g.

Example 2

To an aqueous solution prepared by suspending 10 g. of anhydrous ampicillin in 765 ml. of water and adjusting to pH 2.2 with hydrochloric acid, there is added 30 ml. of ethyl acetate followed by the dropwise addition of a solution of 8.6 g. of the sodium salt of tetrahydronaphthalene sulfonic acid in water, at 5–10° C. After adjusting to pH 1.6 with dilute hydrochloric acid, the mixture is allowed to stir at 2–5° C. overnight. The white, crystalline tetrahydronaphthalene sulfonic acid addition salt of D-6-(2-amino-2-phenylacetamido)penicillanic acid is collected by filtration, washed with cold water and finally washed with ethyl acetate. A 1 g. sample dried in a vacuum oven at 50–60° C. indicates the wet filer cake (18.2 g. total) to contain 69% (12.6 g.) of solids.

The wet filter cake is added to a solution of 30 ml. of anhydrous isopropanol and 2.3 g. of trimethylamine (the mixture contains approximately 3.6 g. of water), at 75–80° C., with stirring. The mixture is allowed to stir for 20 minutes. The white, crystalline anhydrous ampicillin is filtered from the hot reaction mixture, washed with 85% aqueous isopropanol, and dried at 45° C., yield, 7.0 g., or 70% based on the ampicillin present in the original dilute solution, bioassay, 993 mcg. per mg.

Example 3

To an aqueous solution prepared by dissolving 5.0 g., 0.014 mole, of anhydrous ampicillin in 185 ml. of water at pH 1.6, 25 ml. of methyl isobutyl ketone is added followed by the dropwise addition of a solution of 4.0 g., 0.017 mole, of the sodium salt of tetrahydronaphthalene sulfonic acid in 27 ml. of water at 5–10° C. After adjusting the mixture to pH 1.6, crystallization is allowed to occur at 5° C. for 2 hours, with stirring. The tetrahydronaphthalene sulfonic acid addition salt of ampicillin is collected by filtration, washed twice with methyl isobutyl ketone, and dried in a vacuum oven at 30–35° C., yield, 5.6 g., or 70% of theory.

It is converted by the procedure of Example 1 into crystalline anhydrous ampicillin.

Example 4

The procedure of Example 2 is repeated, but omitting the ethyl aceate in the preparation of the acid addition salt; substantially the same results are obtained.

The procedure of Example 1 is repeated, substituting for the ethyl acetate, equal volumes of the following organic water-immiscible solvents: amyl acetate and methylene chloride; substantially the same results are obtained.

The procedure of Example 2 is repeated, substituting for the ampicillin, stoichiometrically-equivalent amounts of the following water-soluble salts of ampicillin: sodium, potassium, calcium, aluminum and ammonium; substantially the same results are obtained.

The procedure of Example 2 is repeated, substituting for the sodium salt of tetrahydronaphthalene sulfonic acid, stoichiometrically equivalent amounts of tetrahydronaphthalene sulfonic acid and its ammonium, potassium and calcium salts; substantially the same results are obtained.

The procedure of Example 1 is repeated, substituting for the triethylamine, stoichiometrically - equivalent amounts of the following amines: ammonia, methylamine, ethylamine, n-propylamine, i-propylamine, n-hexylamine; benzylamine, N,N-dimethylbenzylamine 6-phenyl-n-hexylamine, dimethylamine, diethylamine, di-i-propylamine, di-n-hexylamine, trimethylamine, tri-i-propylamine and tri-n-hexylamine.

The procedure of Example 1 is repeated, substituting for anhydrous isopropanol, the following water-miscible organic solvents: acetone, ethanol, n-propanol, n-butanol, ethylene glycol, ethylene glycol monomethyl ether and dioxane.

What is claimed is:
1. The tetrahydronaphthalene sulfonic acid addition salt of D-6-2-amino-2-phenylacetimido)penicillanic acid.
2. A process for the preparation of the anhydrous ampicillin crystalline form of D-6-(2-amino-2-phenylacetamido)penicillanic acid, which method comprises:
  providing an aqueous solution containing D-6-(2-amino-2-phenylacetamido)penicillanic acid or a water-soluble salt thereof;
  contacting said solution with tetrahydronaphthalene sulfonic acid or a water-soluble salt thereof;
  adjusting the pH of the resulting reaction mixture to within the range of from about 1.0 to about 3.5 until formation of the tetrahydronaphthalene sulfonic acid addition salt of D-6-(2-amino-2-phenylacetamido)penicillanic acid is substantially complete;
  adding to said reaction mixture containing said tetrahydronaphthalene sulfonic acid addition salt of D-6-(2-amino-2-phenylacetamido)penicillanic acid, at least about one equivalent, based on said salt, of an amine of the formula

wherein R, $R^1$ and $R^2$ are, independently, hydrogen, (lower)alkyl or phenyl-substituted-(lower)alkyl, and a reaction medium comprising (a) a water-miscible organic solvent capable of dissolving at least 5% thereof of water, and present in an amount that is at least 20% by volume of said medium, and (b) sufficient free water to bring the total amount of bound and free water in the mixture to at least 10% by weight based on solids present;

heating the resulting reaction mixture at a temperature of from about 50° C. to about 100° C. until formation of said anhydrous ampicillin crystalline form is substantially complete; and separating and recovering said anhydrous ampicillin crystalline form of D-6-(2-amino-2-phenylacetamido)penicillanic acid substantially free of the by-product amine—tetrahydronaphthalene sulfonic acid addition salt, water-miscible organic solvent and free water components in said reaction mixture.

3. A process as defined in claim 2 wherein said amine is ammonia, diethylamine or triethylamine.

4. A process as defined in claim 2 wherein said water-miscible organic solvent comprises from about 50% to about 95% by volume of said medium and said heating occurs in the temperature range of from about 60° C. to about 85° C.

5. A process as defined in claim 2 wherein said water miscible organic solvent is isopropanol which comprises about 85% by volume of said medium and said heating occurs in the temperature range of from about 60° C. to about 75° C.

References Cited

UNITED STATES PATENTS 3,180,862    4/1965    Silvestri et al. _____ 260—239.1

NICHOLAS S. RIZZO, Primary Examiner

U.S. Cl. X.R.

424—271

PO-1050
(5/69)

UNITED STATES PATENT OFFICE
CERTIFICATE OF CORRECTION

Patent No. 3,534,035                    Dated October 13, 1970

Inventor(s)  John J. Nescio

It is certified that error appears in the above-identified patent and that said Letters Patent are hereby corrected as shown below:

In column 1, line 20, "without", second occurrence, should be omitted;
line 20, "ned" should read --need--;
line 58, "crystallite" should read --crystalline--.
In column 2, line 7, "eample" should read --example--;
lines 9 and 10, which reads "closed in U.S. 3,144,445, when the precursor comprises crystalline hydrate of ampicillin. For example as is dis-", should read --closed in U.S. 3,144,445, when the precursor comprises crystalline ampicillin monohydrate, one admirable suit- --.
In column 5, line 16, "oragnic" should read --organic--;
line 36, "orgnaic" should read --organic--.
In column 6, line 12, after "with", "the" should be omitted.
In column 8, line 58, (in claim 1) "D-6-2-amino-2-phenylacetamido)penicillanic acid" should read --D-6-(2-amino-2-phenylacetamido)penicillanic acid--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents